INVENTORS:
Edward B. McMillan
Raymond M. Redheffer

INVENTORS:
Edward B. McMillan
Raymond M. Redheffer 2,956,281
Patented Oct. 11, 1960

United States Patent Office

2,956,281

DIELECTRIC WALLS FOR TRANSMISSION OF ELECTROMAGNETIC RADIATION

Edward B. McMillan, Ipswich, Mass. (Perkins Row, Topsfield, Mass.), and Raymond M. Redheffer, 176 N. Kenter Ave., Los Angeles 49, Calif.

Filed Sept. 8, 1954, Ser. No. 454,738

13 Claims. (Cl. 343—872)

This invention relates to dielectric walls for transmission of electromagnetic radiation and particularly to a new type of dielectric wall which may provide both high strength and light weight.

This application is a continuation in part of our copending application Serial Number 372,108 filed August 3, 1953, Patent No. 2,854,668 and entitled Dielectric Walls for Transmission of Centimetric Radiation.

Dielectric walls for transmission of centrimetric electromagnetic radiation have in general been in the form of dielectric sheets or laminates selected as to material and formed as to shape and wall thickness to insure the necessary transmission characteristics either for the purpose of preventing distortion of the beam or for focusing. Dielectric walls providing such control prior to the present invention have either been undesirably heavy because of the density of the material or if of low density have lacked necessary mechanical strength.

We have invented an improvement in dielectric walls for transmission of microwave or centrimetric radiation, comprising a dielectric wall for transmission of electromagnetic waves, the wall comprising a dielectric sheet wherein the dielectric constant increases from the faces to the interior. One specific example of such a wall is a dielectric wall wherein the dielectric constant of a cellular layer is adjusted to the values required by the design equations by the addition and distribution of conductive particles in the layer, the over-all dielectric constant of the layer approximating the dielectric constant of an adjacent solid, high-strength layer.

It is an object of the present invention to provide an improved dielectric wall which possesses satisfactory mechanical strength for the construction of lenses or radomes, and is free from undesired optical discontinuity.

According to the present invention, we provide a lightweight cellular material of which the cell walls are given a dielectric constant of such value that the effective dielectric constant of walls and voids approximates the dielectric constant of a solid dielectric material. We have found that the dielectric constant of the cellular material may be controlled accurately by dispersing in or on the cell walls certain types of particles, particularly metal particles insulated from one another.

In a preferred form of the invention, this cellular dielectric material may be matched in dielectric constant to and combined with outer skin sheets or structural reinforcement, or both, of solid, high-strength dielectric material to form a novel, strong dielectric wall free from undesired optical discontinuity.

In a modification of the invention, uniform weight distribution of the cellular material is insured by expanding controlled small quantities of dielectric material to provide uniform bodies of small cross-section and controlled dielectric constant and by arranging these bodies in side-by-side relationship to provide a layer in which the exposed faces of the bodies provide a substantially continuous surface. In one form, the portions of the body may be formed by expanding the material within the spaces of a dielectric honeycomb sheet which remains in the structure to give greater structural strength.

In a still further modification of the present invention, an electrically homogeneous dielectric wall comprises an outer skin sheet of dielectric material supported by ribs of dielectric material extending along an inner face, and a cellular layer having a thickness and dielectric constant approximately equal respectively to the thickness and dielectric constant of the ribs and extending along said inner face between the ribs. Such a construction removes the electrical discontinuity that would otherwise exist at the edge of said ribs.

Reference is made to the drawings forming a part of the present disclosure, in which.

Figure 1:
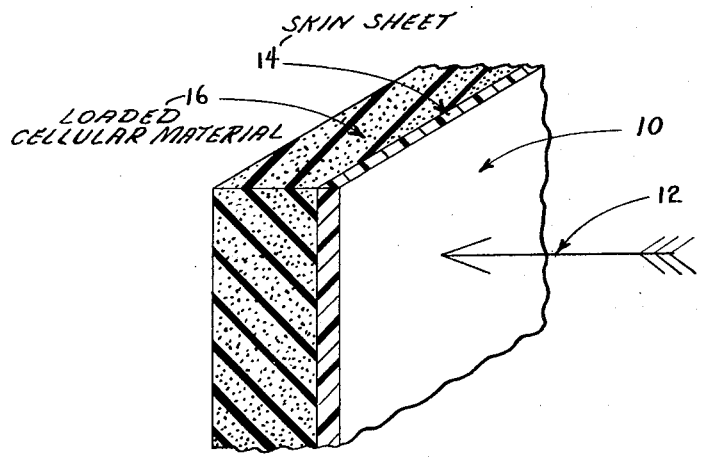
Figure 1 is an isometric view of one form of dielectric wall constructed in accordance with the present invention.

Lenses for electromagnetic waves are usually designed to obtain a given and uniform refraction in each layer. The refraction which a layer produces is determined by its dielectric constant. The higher the dielectric constant of a layer the thinner it may be for a given refraction. Prior to the present invention, lenses of sufficient size and thickness for the control of centrimetric radiation have been constructed either of strong, high-dielectric-constant solid materials or of light, weak, low-dielectric-constant cellular dielectrics. The former have been too heavy while the latter have been too weak and too bulky. To combine the lightness of a cellular material with the thinness of a solid material, we have devised a body of high dielectric constant comprising a cellular dielectric in which the cellular walls are loaded with particles having a high over-all dielectric constant. To strengthen the cellular portion of the wall, we have combined with it layers and ribs of solid structural dielectrics, and to obtain uniform refraction in this combination, we have loaded the cellular material with the high-dielectric-constant particles, until its average dielectric constant approximates that of the solid portions of the wall.

Non-reflecting dielectric windows for electromagnetic waves are usually designed so that the reflections which occur at the interfaces of adjacent layers of materials of unequal dielectric constant cancel out in phase and amplitude. A method of designing a non-reflecting window which is to be required to transmit all components of polarization of the radiation without changing the phase of one component with respect to another is to provide that its electrical thickness along a given wave path be substantially one-half of a wave or any whole multiple thereof in length and its dielectric constant uniform throughout. This method precludes the use of the structure of our U.S. Patent No. 2,617,934 of Novemeber 11, 1952, in which solid materials of high dielectric constant are combined with cellular materials of low dielectric constant. Our new method of combining high-strength solid materials with loaded cellular materials of substantially the same dielectric constant may be employed to obtain both lightness and strength and improved phase characteristics in dielectric windows for use in the centimetric region.

The simplest structure under the present invention is a layer of cellular dielectric material having a dielectric constant of such a value that the average dielectric constant of the cells approximates the dielectric constant of a denser material. This may be accomplished by loading the cell walls with dielectric particles of very high dielectric constant.

In some cases it may be desired to have some loss in the cell walls, but in most cases it is desired to reduce loss to a minimum. In the latter event we pre-coat the particles with an insulating adherent coating such as a stearate.

The controlled dispersion of particles throughout a dielectric body is difficult if the body is large. To obtain sufficient control and uniformity in such a case, we divide the cellular layer into a plurality of smaller portions in side-by-side relationship. We find that, with sufficient sub-division if each portion contains a predetermined weight of particles and cells, the average dispersion for all portions can be regulated with sufficient control.

Since under the present invention the cellular dielectric material possesses the dielectric constant of a denser material, it is possible to maintain a uniform dielectric constant throughout and to avoid diffraction and reflection at the interfaces while reinforcing our cellular layer with ribs or partitions. These may be conveniently located between the side surfaces of adjacent portions of the cellular dielectric.

In Figure 1 is shown an isometric view of a dielectric wall 10 constructed in accordance with the present invention, comprising a skin sheet 14 of dielectric material and a layer 16 of our cellular dielectric material extending along the skin sheet 14. Typical suitable skin-sheet materials obtainable in the same dielectric constant as our cellular material are plastic laminates of resins and fabrics, ceramic plates, rubber sheeting, inflatable rubber de-icing-boot sheeting, wood, and glass. Our cellular material may be designed to be placed alongside layers of a different electrical nature such as metal sheets which pass centimetric radiation through slots, metal grids through which transmission may pass, and dielectrics of a higher or lower dielectric constant. It may also be placed between the plates of metal-plate lenses to obtain electromagnetic-wave acceleration.

Typical suitable cellular dielectric material may comprise plastic foams, hollow beads, small enclosed prisms, foamed ceramic, glass bubbles, exploded mica, pearlite and other natural cells, and incompletely sintered dielectric powders. The loading of very high-dielectric material may be in the form of particles dispersed either in or on the cell walls. If the loading material is of very low electrical conductivity, the particles may be in contact with one another to form a continuous film or network. Where the conductivity is appreciable, the particles must be insulated from one another if it is desired to avoid loss through power absorption by them. Suitable particle materials comprise polymeric electrolytes, titanates and similar high dielectrics, metals, carbon black, and graphite.

Example 1

In Figure 1 is illustrated a dielectric wall 10, constructed in accordance with the present invention, disposed angularly across the wave path 12 of centimetric radiation. An outer skin sheet 14 extends along the surface of a layer of cellular material 16. The cellular layer 16 comprises cell walls having a dielectric constant of such value that the average dielectric constant of walls and voids of this layer approximates the dielectric constant of the skin sheet 14. Thus a combination is obtained of a solid, usually high-strength layer with a light-weight cellular dielectric.

The layer of cellular material 16 was 4 inches thick and comprised a resin which, having been loaded with magnesium-stearate-coated metallic particles insulated from one another, was foamed and cured to retain its cellular state.

The material was prepared by dusting 36 weight parts of extra fine aluminum powder with 2 weight parts of powdered magnesium stearate and then very thoroughly stirring the combination into 100 weight parts of an alkyd resin having an acid number of approximately 50. Next, while these ingredients were kept from overheating by refrigeration, 92 weight parts of toluene diisocyanate was stirred in for nearly 30 minutes until the release of a reaction product of carbon dioxide began to boil the mixture. At this point, the mixture was quickly poured into an open mold where in a period of 5 minutes a rigid dielectric foam was formed. It was then placed in an oven for 2 hours to post-cure at 110° C. After cooling the foam to room temperature, its dielectric constant was found to be 4.0 and its loss tangent 0.014 at 9375 megacycles per second.

A slice 3.97 inches thick was cut and layers of fiberglass fabric impregnated with benzoyl-peroxide-catalyzed polyester-styrene resin were laminated against it to form a strong, rigid, outer skin sheet 14 which was 0.030 inch thick and possessed substantially the same dielectric constant as the foam layer. Pieces of this laminated dielectric were then used as a dielectric material for microwave lenses, the foam layer being easily cut to the contour of the lens shape.

Example 2

Figure 2:
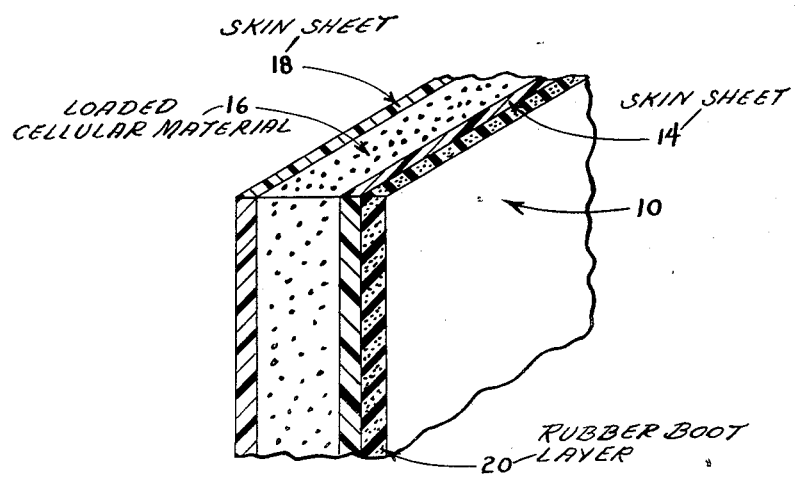
Figure 2 is an isometric view of another form of dielectric wall constructed in accordance with our invention.

In Figure 2 is shown the dielectric wall of Figure 1 modified in accordance with another aspect of the present invention. A second skin sheet 18 of a fiber-glass-polyester resin was laminated to the opposite side of the layer 16 of cellular material from the first skin sheet 14. A rubber boot layer 20 comprising air-inflatable sub-layers, as commonly designed for de-icing the leading surfaces of commercial aircraft, was cemented to the outer surface of layer 14. The dielectric constant of each layer was close to that of the other layers, being in this case 4.0 for the second skin sheet 18, 3.5 for the layer 16 of cellular material, 4.0 for the first skin sheet 14, and 3.5 for the rubber boot layer 20.

The differences in the refractive properties of the layers were small, being proportional to the square roots of the respective differences in dielectric constant. The cellular layer 16 had been sliced so as to have a uniform thickness of 0.183 inch, the thickness of skin sheets 14 and 18 was each 0.030 inch, and the thickness of the cemented rubber boot layer was 0.090 inch, the total being 0.333 inch. This total was equivalent to a half-wave length in the layers for 9375-megacycles-per-second radiation at normal incidence and was designed to reduce reflection of power by the dielectric wall and permit transmission of all components of polarization of the radiation without substantially changing the phase of one component with respect to the other. If we had employed almost any of the generally used low-dielectric-constant cellular materials, it would have been impossible to construct an electrically satisfactory wall having a greater thickness of solid outer layers on one side than on the other. It should be noted that this design provides a low-reflection wall for a series of frequencies such that the electrical thickness of the wall is equivalent to any whole multiple of one-half the wavelength. Thus radiation at nearby frequencies can be readily transmitted.

Example 3

Figure 3:
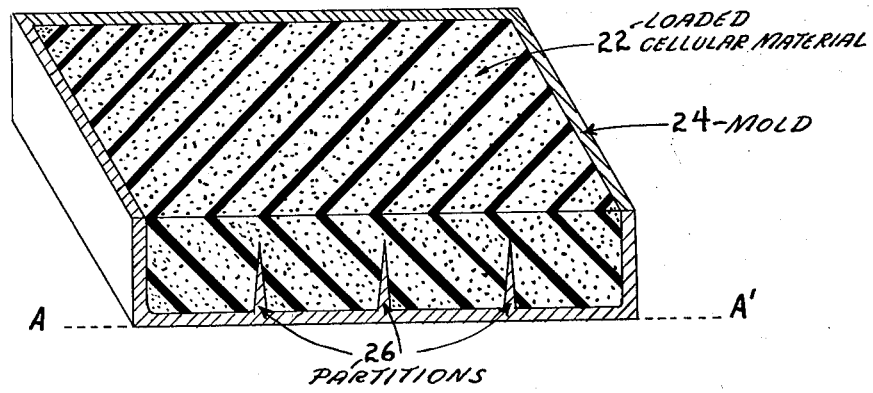
Figure 3 is an isometric view with a cut-away section showing the cellular material of our invention cast in a mold.

In Figure 3 is shown our cellular material 22 cast in a mold 24 constructed with lengthwise partitions 26 revealed by section A—A'. By sub-dividing the cellular material 22 into a plurality of smaller portions, we limited its lateral flow during the foaming operation, thus controlling the distribution of density, the dispersion of high-dielectric-constant particles, and the average dielectric constant. If desired, each portion could be caused to have a different dielectric constant so that a step lens could be constructed. However, in the case illustrated, all portions possessed an average dielectric constant of 3.8.

Figure 4:
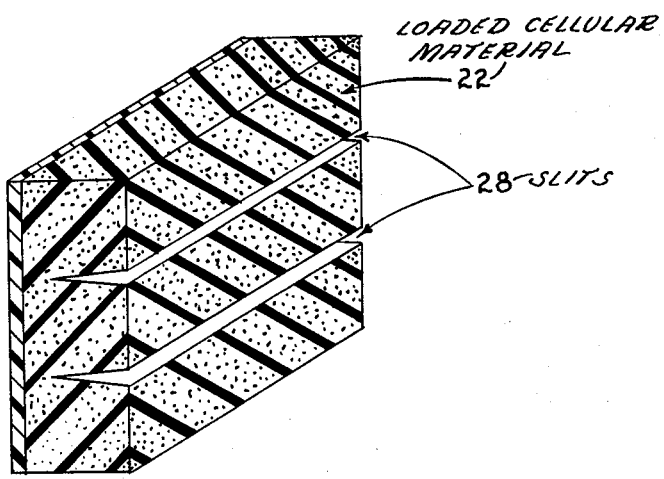
Figure 4 is an isometric view of still another dielectric wall constructed in accordance with the present invention.

In Figure 4 is shown the sub-divided cellular layer 22 cemented against the outer skin sheet of Figure 1. The composition of the former was 100 weight parts of silicone resin in which had been thoroughly dispersed 16 weight parts of extra fine aluminum lining powder and 3 weight parts of diazoaminobenzene. This composition had then been heat blown and cured to a density corresponding to a dielectric constant of 3.8.

We have found that the slits 28 in the cellular layer readily adapt it to bending to form against curved skin sheets. Likewise, we have found it advantageous to extrude our cellular core materials in long substantially rectangular strips which can be laid side by side to form a substantially continuous surface against a skin sheet.

*Example 4*

Figure 5:
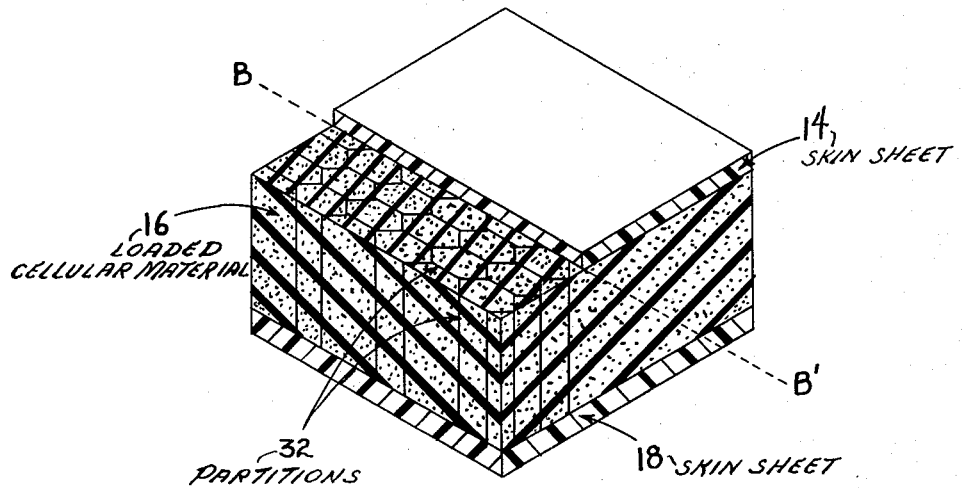
Figure 5 is an isometric view with a cut-away section showing a dielectric wall including the partitions and cellular material in accordance with our invention.

In Figure 5 is shown a further modification of the dielectric wall according to our invention. The layer 16 of cellular core material has been sub-divided by thin partitions 32 arranged in honeycomb style as shown by cut-away section B—B'. The partitions 32 were formed from a fiber-glass-phenolic resin laminate 0.015 inch thick, having a dielectric constant of 4.2. They extended from skin sheet 14 to skin sheet 18 at a high angle to the surface of each and were cemented to each of the sheets, thus serving as a structural reinforcement as well as a means of dividing the cellular material. The latter had been placed in each honeycomb space as follows:

100 weight parts of silicone rubber paste were loaded with 10 weight parts of diazoaminobenzene, 16 weight parts of boric acid, and 21 weight parts of extra fine aluminum powder which had been coated with magnesium stearate. The loaded paste was thinned with toluene and coated onto the surfaces of the partitions. The partition structure was then placed between skin sheets 14 and 18 prior to the hardening and cure of the latter. Heat was applied to the assembly for 30 minutes at 70° C., followed by 30 minutes at 80° C., and one hour at 125° C. This treatment hardened and cured the skin sheets 14 and 18, cemented them to the partition structure, and foamed the silicone compound until it filled each honeycomb space. On electrical test, we found that the assembly behaved substantially as a homogeneous electrical panel free from internal optical discontinuities for centimetric radiation. In practice, the silicone-compound-coated honeycomb structure proved readily formable against curved skin sheets.

We also found that weak partitions of resin-stiffened paper could be coated with metal particles and blowing-agent-loaded resin compositions which, on being expanded, yielded strong, rigid foams of sufficient structural value to combine the skin sheets into a strong sandwich structure.

*Example 5*

Figure 6:
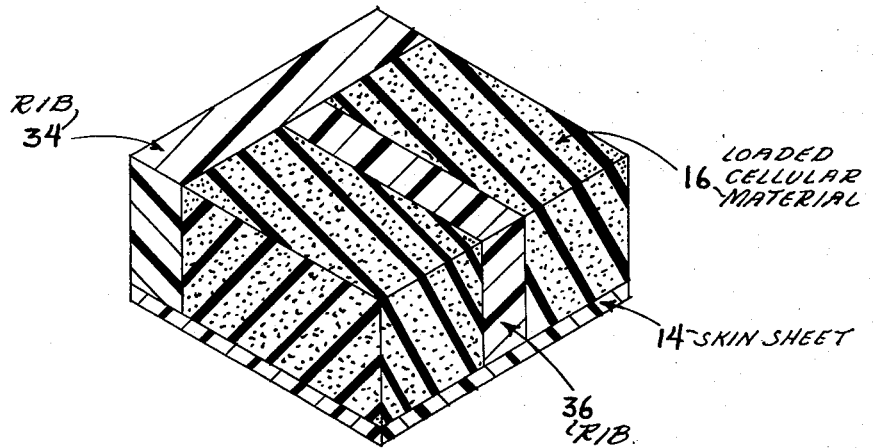
Figure 6 is an isometric view of a ribbed wall constructed in accordance with our invention.

In Figure 6 is illustrated the dielectric wall of Figure 1 strengthened with ribs 34 and 36 of dielectric material of approximately the same dielectric constant as the skin sheet 14 and the cellular material 16. Despite the differences in density of the component materials, no internal optical discontinuities existed.

It can be readily seen that, with the ribbed, honeycombed, and sandwiched forms of our dielectric wall, unique and useful structures of high strength and light weight can be built.

For the purpose of describing our invention, certain specific embodiments and materials have been illustrated, but it is to be understood that the invention is not to be limited thereto, since it is evident that such other embodiments and materials are contemplated as are within the spirit and scope of the invention.

What we claim is:

1. A dielectric wall adapted for through passage of centimetric radiation impinging on a face thereof comprising a skin sheet of dielectric material constituting a face of said wall, thin partition walls of dielectric material disposed at a high angle to said skin sheet and subtending small areas on said skin sheet, and a layer of cellular dielectric material extending along said skin sheet within the solid areas enclosed by said partition walls, the quantity of dielectric material enclosed by said partition walls in each of said areas being proportional to said areas, said cellular layer comprising cell walls having a dielectric constant higher than that of said skin sheet providing an effective resultant dielectric constant of the combination of walls and voids of said cellular layer approximating the dielectric constant of said skin sheet, whereby diffraction of said radiation in said wall is reduced.

2. The dielectric wall of claim 1 in which said cellular dielectric layer carries dielectric particles supported by the cell walls to provide a dielectric constant of the cell walls is higher than that of said skin sheet providing an effective resultant dielectric constant of walls and voids of said cellular layer approximating the dielectric constant of said skin sheet.

3. The dielectric wall of claim 2 in which said dielectric particles comprise metallic particles insulated from each other.

4. A dielectric wall for transmission of electromagnetic radiation, said wall comprising the combination of at least one solid dielectric portion and at least one cellular dielectric portion, said cellular dielectric portion being loaded with relatively high-dielectric-constant material to such an extent as to impart to said cellular dielectric portion an effective dielectric constant substantially equal to that of said solid dielectric portion, whereby diffraction of said electromagnetic radiation in said dielectric wall is reduced.

5. A dielectric wall for transmission of electromagnetic radiation, said wall comprising the combination of at least one portion of relatively high-strength material and at least one portion of relatively light-weight material, said relatively light-weight material having dispersed therethroughout a finely divided material in sufficient quantity to impart to said relatively light-weight material an over-all dielectric constant substantially equal to that of said relatively high-strength material, whereby diffraction of said electromagnetic radiation in said dielectric wall is reduced.

6. A dielectric wall according to claim 5, in which the electrical thickness of said wall is adjusted to be substantially equal to an integral number of half wavelengths of said electromagnetic radiation in the wall.

7. A dielectric wall according to claim 5, in which said portion of relatively light-weight material is embraced by portions of relatively high-strength material on each side thereof.

8. A dielectric wall according to claim 5, in which said portion of relatively high-strength material comprises a plurality of ribs set into and reinforcing said portion of relatively light-weight material.

9. A dielectric wall according to claim 5, in which said portion of relatively high-strength material constitutes a skin sheet applied to a surface of said portion of relatively light-weight material, and in which said portion of relatively light-weight material has slots formed therein to permit flexure of said relatively light-weight material and of said dielectric wall.

10. A dielectric wall according to claim 5, in which said relatively light-weight material substantially fills the interstices of a honeycomb of said relatively high-strength material.

11. A dielectric wall according to claim 5, in which said relatively light-weight material substantially fills the interstices of a honeycomb of said relatively high-strength material, and in which at least one face of said filled honeycomb is covered by a sheet of relatively high-strength material.

12. A dielectric wall according to claim 5, in which portions of relatively high-strength material constitute substantially orthogonal ribs reinforcing said portions of relatively light-weight material.

13. A dielectric wall according to claim 5, in which portions of relatively high-strength material constitute substantially orthogonal ribs reinforcing said portion of relatively light-weight material, and in which at least one face of said reinforced light-weight material is covered by a sheet of relatively high-strength material.

References Cited in the file of this patent

UNITED STATES PATENTS

| | | |
|---|---|---|
| 2,493,032 | Rheinfrank | Jan. 3, 1950 |
| 2,501,072 | McMillan et al. | Mar. 21, 1950 |
| 2,508,479 | Wheeler | May 23, 1950 |
| 2,511,610 | Wheeler | June 13, 1950 |
| 2,599,944 | Salisbury | June 10, 1952 |
| 2,617,934 | McMillan et al. | Nov. 11, 1952 |
| 2,639,248 | Overholt | May 19, 1953 |
| 2,641,561 | Black | June 9, 1953 |
| 2,716,190 | Baker | Aug. 23, 1955 |
| 2,742,387 | Giuliani | Apr. 17, 1956 |
| 2,744,042 | Pace | May 1, 1956 |

OTHER REFERENCES

"Radome Design for Highspeed Aircraft" (Garcia): Aerodigest, vol. 67, No. 6, December 1953, pp. 74–7, 78, 80 and 83–84.

"The Dielectric Properties of the Rutile Form of $TiO_2$" (Berberich and Bell): J. App. Physics, vol. 11, pp. 681–692, October 1940.

"Electrical Design of Normal-Incidence Radomes" (Leaderman): Radar Scanners and Radomes, MIT RL Series, vol. 26; pub. by McGraw-Hill Book Co., Inc. (1948), pp. 259–285.